(12) United States Patent  (10) Patent No.: US 8,728,641 B2
Kagami  (45) Date of Patent: May 20, 2014

(54) STARTUP GAS SUPPLY PRESSURE CONTROL DEVICE OF FUEL CELL SYSTEM

(75) Inventor: Fumio Kagami, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 737 days.

(21) Appl. No.: 12/250,854

(22) Filed: Oct. 14, 2008

(65) Prior Publication Data

US 2009/0110987 A1    Apr. 30, 2009

(30) Foreign Application Priority Data

Oct. 15, 2007  (JP) ................................. 2007-267526

(51) Int. Cl.
*G03C 3/00* (2006.01)
(52) U.S. Cl.
USPC .......................................................... 429/13
(58) Field of Classification Search
USPC .......................................................... 429/13
See application file for complete search history.

(56) References Cited

U.S. PATENT DOCUMENTS

| | | | | |
|---|---|---|---|---|
| 5,935,726 A * | 8/1999 | Chow et al. | ................... | 429/430 |
| 6,103,409 A * | 8/2000 | DiPierno et al. | .............. | 429/446 |
| 6,127,057 A * | 10/2000 | Gorman | ......................... | 429/429 |
| 6,376,111 B1 * | 4/2002 | Mathias et al. | ................ | 429/413 |
| 6,379,827 B1 * | 4/2002 | Cipollini | ...................... | 429/429 |
| 6,383,671 B1 * | 5/2002 | Andrews et al. | ............... | 429/413 |
| 6,472,090 B1 * | 10/2002 | Colbow et al. | ................. | 429/443 |
| 6,861,167 B2 * | 3/2005 | Wells et al. | .................... | 429/432 |
| 7,112,379 B2 * | 9/2006 | Skiba | ............................. | 429/414 |
| 7,179,557 B2 * | 2/2007 | Breault | ......................... | 429/437 |
| 7,517,600 B2 * | 4/2009 | Arthur et al. | .................. | 429/413 |
| 2007/0042235 A1 * | 2/2007 | Kagami et al. | .................. | 429/12 |
| 2008/0206610 A1 * | 8/2008 | Saunders et al. | ................ | 429/13 |

FOREIGN PATENT DOCUMENTS

| | | |
|---|---|---|
| JP | 2006-100095 | 4/2006 |
| JP | 2006-156181 | 6/2006 |
| JP | 2006-351506 | 12/2006 |
| JP | 2007-220538 | 8/2007 |

* cited by examiner

*Primary Examiner* — Kimberly Rizkallah
*Assistant Examiner* — Caleb Henry
(74) *Attorney, Agent, or Firm* — Drinker Biddle & Reath LLP

(57) ABSTRACT

A startup control device of a fuel cell system includes a fuel cell stack having a plurality of fuel cells stacked together, each of the fuel cells having a membrane electrode assembly including an electrolyte membrane interposed between a cathode electrode and an anode electrode. The device further includes a gas supply unit configured to supply a gas to the fuel cell stack and a controller configured to control the gas supply unit based on a parameter value related to the occurrence of flooding of the fuel cell stack. During startup of the fuel cell stack, the gas is supplied to the fuel cell stack at a first supply pressure for a time period determined based on the parameter value, and after the time period has expired, gas is supplied to the fuel cell stack at a second supply pressure, the second supply pressure being less than the first supply pressure.

13 Claims, 18 Drawing Sheets

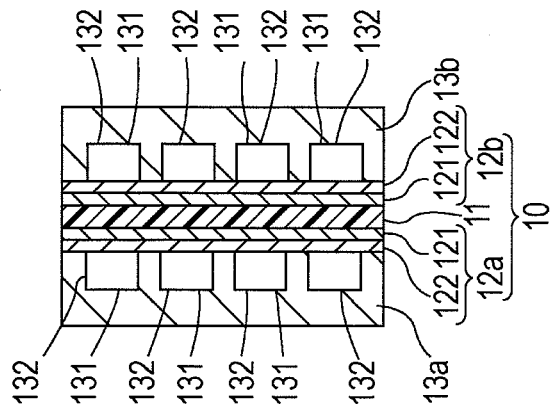
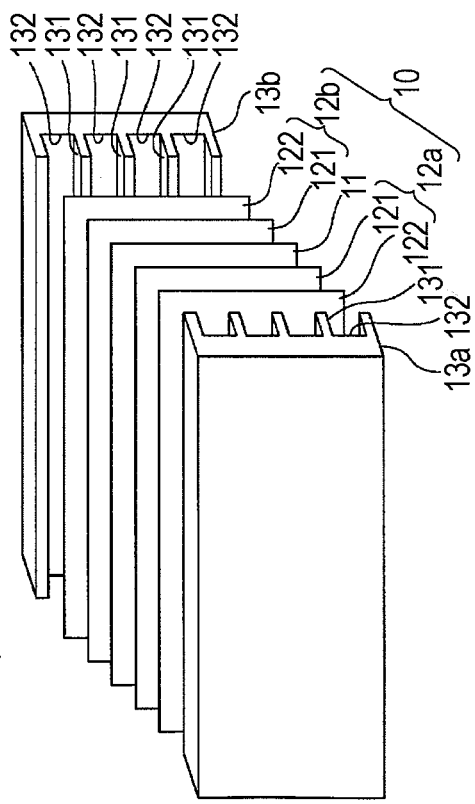

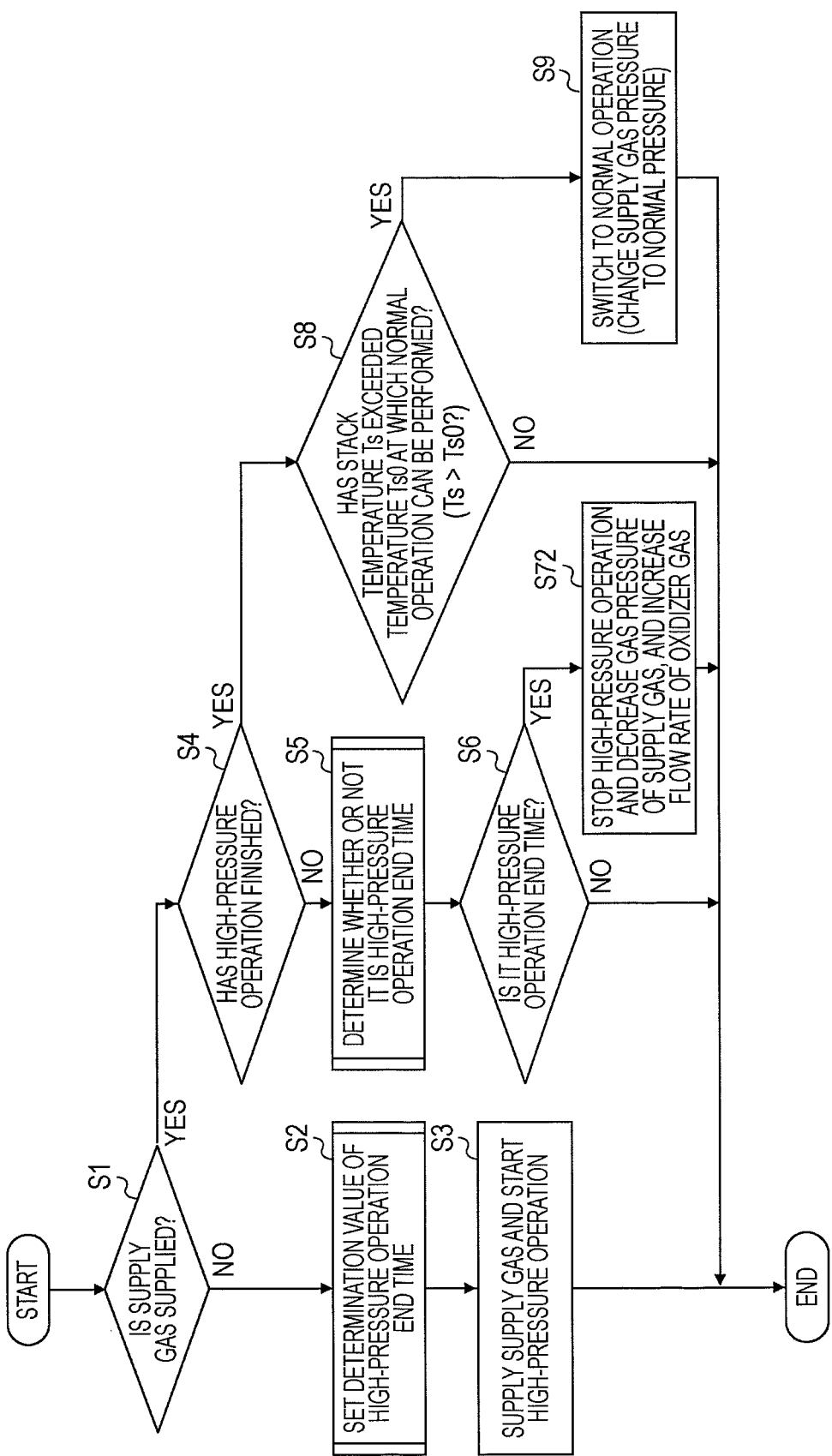

STARTUP GAS SUPPLY PRESSURE CONTROL DEVICE OF FUEL CELL SYSTEM

CROSS-REFERENCE TO RELATED APPLICATIONS

This application claims priority to Japanese Patent Application No. 2007-267526 filed Oct. 25, 2007, which is incorporated by reference herein in the entirety.

BACKGROUND OF THE INVENTION

1. Field of the Invention

The present invention relates to a device and method for controlling the startup of a fuel cell system.

2. Description of Related Art

A fuel cell is a device that directly converts chemical energy of a fuel into electrical energy by allowing reactant gases (namely, an anode gas such as hydrogen and a cathode gas such as air) to electrochemically react with each other. Such fuel cells are classified into various types of fuel cells in accordance with, for example, the type of electrolyte used. One type of fuel cell is a solid polymer electrolyte fuel cell in which a solid polymer electrolyte is used as the electrolyte.

In a solid polymer electrolyte fuel cell, the following catalytic electrode reactions are carried out in an anode electrode and a cathode electrode.

$$\text{Anode electrode: } 2H_2 \rightarrow 4H^+ + 4e^- \quad (1)$$

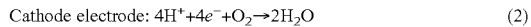

$$\text{Cathode electrode: } 4H^+ + 4e^- + O_2 \rightarrow 2H_2O \quad (2)$$

In this manner, when an anode gas ($H_2$) is supplied to the anode electrode, the reaction represented by formula (1) is carried out to produce hydrogen ions ($H^+$). The resulting hydrogen ions ($H^+$) permeate through (diffuse into) an electrolyte (e.g., a solid polymer electrolyte membrane in the case of a solid polymer electrolyte fuel cell) in a hydrated state and reach the cathode electrode. The reaction represented by formula (2) is then carried out using the hydrogen ions together with a cathode gas (for example, air) supplied to the cathode electrode. The reactions represented by formulas (1) and (2) are carried out in the electrodes, and thus the fuel cell generates electricity which may be used for motive force. The electricity commonly generated by a typical fuel cell is at about 1 volt. Consequently, in order to use fuel cells as a power source of an automobile, a plurality of fuel cells are provided in the form of a fuel cell stack in which several hundred fuel cells are stacked together in series. In addition, in order to use fuel cells as a power source of an automobile, it is desirable that the fuel cell system be capable of being rapidly started in any ambient environment.

As represented by formula (2), a fuel cell produces moisture ($H_2O$) in the cathode electrode concurrently with the power generation. When the operation of a fuel cell is stopped in an environment at a temperature below the freezing point, and the fuel cell is unused for a period and then started at a temperature below the freezing point, the water produced may be in a state in which the water is frozen on an electrode catalyst or a gas diffusion layer adjacent to the electrode catalyst. In such a state, the electrode reaction area is decreased, thereby significantly degrading the ability of a reactant gas to diffuse to the electrode catalyst. In such a case, it is known in the art that by increasing the gas pressure of a reactant gas supplied to the fuel cell stack, the reactant gas is more consistently able to reach a reaction site where a catalytic electrode reaction occurs.

BRIEF SUMMARY OF THE INVENTION

It is accordingly an object of the present invention to provide a startup control device of a fuel cell system and a startup control method of the fuel system to enable the system to startup more quickly and to attain normal operation while avoiding flooding.

In an embodiment, the invention provides a startup control device of a fuel cell system including a fuel cell stack having a plurality of fuel cells stacked together, each of the fuel cells having a membrane electrode assembly including an electrolyte membrane interposed between a cathode electrode and an anode electrode. The device further includes a gas supply unit configured to supply a gas to the fuel cell stack and a controller configured to control the gas supply unit based on a parameter value related to the occurrence of flooding of the fuel cell stack. During startup of the fuel cell stack, the gas is supplied to the fuel cell stack at a first supply pressure for a time period determined based on the parameter value, and after the time period has expired, gas is supplied to the fuel cell stack at a second supply pressure, the second supply pressure being less than the first supply pressure.

In another embodiment, the invention provides a fuel cell system including a fuel cell stack in which a plurality of fuel cells are stacked together, each of the fuel cells having a membrane electrode assembly including an electrolyte membrane interposed between a cathode electrode and an anode electrode. The device further includes a gas supply unit configured to supply a gas to the fuel cell stack and a controller configured to compare a parameter value showing the degree of variation in the voltage of the fuel cells with a predetermined value and to control the gas supply unit based on the parameter value. During startup of the fuel cell stack, when the degree of variation in the voltage is larger than the predetermined value, the controller controls the supply pressure of the gas supplied to the fuel cells so that the supply pressure is lower than the supply pressure of the gas when the degree of variation in the voltage is smaller than the predetermined value.

In still another embodiment, the invention provides a method of controlling the startup of a fuel cell system including a fuel cell stack having a plurality of fuel cells stacked together, each of the fuel cells having a membrane electrode assembly including an electrolyte membrane interposed between a cathode electrode and an anode electrode. The method includes supplying a gas to the fuel cell stack at a supply pressure, determining a time period based a parameter value related to the occurrence of flooding of the fuel cell stack, controlling the supply pressure during startup of the fuel cell stack to be a first supply pressure during the time period, and controlling the supply pressure during startup of the fuel cell to be a second supply pressure after the time period has expired, the second supply pressure being less than the first supply pressure.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIGS. 2A and 2B are an exploded perspective view and a cross-sectional view, respectively, illustrating the structure of an embodiment of a fuel cell.

FIG. 17 is a flowchart showing a main routine for controlling a startup control device according to a sixth embodiment of the present invention.

DETAILED DESCRIPTION

A first embodiment of the present invention will hereinafter be described with reference to the accompanying drawings. The present invention provides for quick startup of a fuel cell system. As a result of intensive studies in developing an embodiment of the present invention, a factor has been determined which prevents a fuel cell system from starting up quickly. In order to facilitate understanding of the present invention, this finding will be described.

Figure 1A:
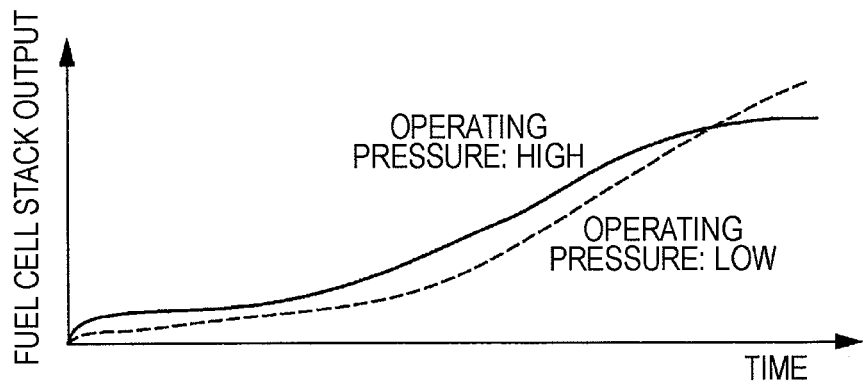
FIG. 1A is a graph showing fuel cell stack output versus time during startup as a function of operating pressure.
Figure 1B:
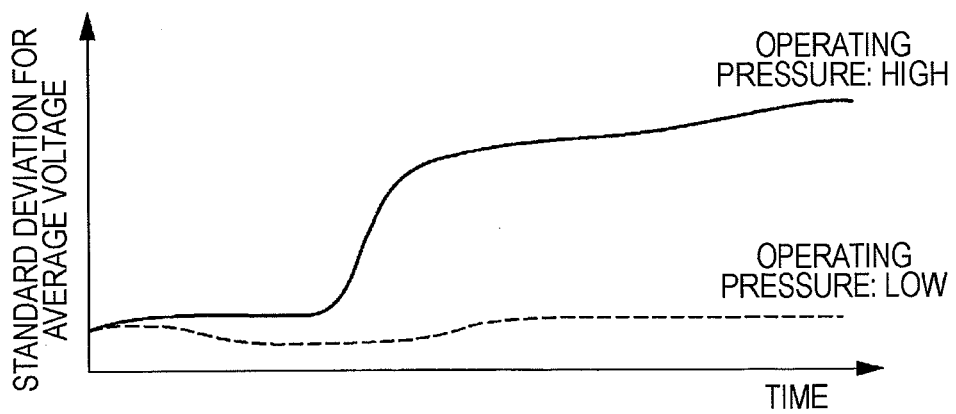
FIG. 1B is a graph showing the standard deviation of average voltage output from a fuel cell stack versus time during startup as a function of operating pressure.

FIGS. 1A and 1B are graphs showing the results of experiments performed during startup of a fuel cell system. FIG. 1A shows the change in fuel cell stack output, and FIG. 1B shows the variation in the average voltage of fuel cells, when the operating pressure (the supply pressure of a gas) is changed during startup of a fuel cell (i.e., during the transient time period when operation of a fuel cell is initiated).

During startup of a fuel cell, particularly during startup of a fuel cell at a temperature below the freezing point, it is preferable that the supply pressure of a reactant gas is increased. The experimental results of FIG. 1A also show that as the supply pressure of a reactant gas is increased, the fuel cell stack output is increased immediately after the operation of the fuel cell is started. However, once a certain period of time has elapsed after starting the operation of the fuel cell, the fuel cell stack output is not increased further. The studies conducted in developing the present invention have determined that this phenomenon is caused by flooding of the stack due to moisture produced by the reactions inside the fuel cells.

As shown in FIG. 1B, in the case where the operating pressure is high, the standard deviation of the fuel cell voltage does not change significantly during a time period spanning from the start of operation to a transition time, but varies significantly at the transition time to a higher level of standard deviation. The transition time can range, for example, from about 20 seconds to about 40 seconds, but can be longer or shorter than these exemplary times based on the temperature of the fuel cell stack or any number of other factors.

The effect of flooding will be described in the context of the structure of a fuel cell. It is understood that a plurality of fuel cells, perhaps as many as several hundred, each having the structure described herein, can be stacked and held at a predetermined surface pressure to produce a fuel cell stack 100. FIGS. 2A and 2B illustrate the structure of an individual fuel cell 2. FIG. 2A is an exploded perspective view showing the fuel cell structure, and FIG. 2B is a cross-sectional side view of the fuel cell 2. The fuel cell 2 has a structure in which a cathode separator 13a is disposed on a surface of a membrane electrode assembly ("MEA") 10 and an anode separator 13b is disposed an opposed surface of the MEA 10.

The MEA 10 includes an electrolyte membrane 11, a cathode electrode 12a, and an anode electrode 12b. The electrolyte membrane 11 is a proton-conductive ion-exchange membrane made of a fluorocarbon resin. The electrolyte membrane 11 exhibits a satisfactory electrical conduction property in a wet state. Therefore, in order to utilize the performance of the electrolyte membrane 11 to improve the power generation efficiency, it is necessary to maintain an optimum moisture condition of the electrolyte membrane 11. Accordingly, in this embodiment, reactant gases (a cathode gas and an anode gas) introduced into the fuel cell are moisturized. Purified water is preferably used as water for maintaining the optimum moisture condition of the electrolyte membrane 11. This is because when water containing impurities is supplied to the fuel cell, the impurities are accumulated on the electrolyte membrane 11, thereby decreasing the power generation efficiency of the fuel cell.

The cathode electrode 12a is provided on a surface (shown on the left side in FIG. 2B) of the electrolyte membrane 11, and the anode electrode 12b is provided on the reverse surface (shown on the right side in FIG. 2B) thereof. Each of the cathode electrode 12a and the anode electrode 12b includes a catalyst layer 121 and a gas diffusion layer 122. The catalyst layer 121 can be composed of, for example, carbon black particles on which platinum is supported. The gas diffusion layer 12 is composed of a member having satisfactory gas diffusibility and electrical conductivity properties, e.g., a carbon fiber.

The cathode separator 13a is disposed at the outside of the cathode electrode 12a. Ribs 131 are provided so as to project from a surface of the cathode separator 13a toward the cathode electrode 12a, thus forming reactant gas flow paths 132 between the ribs 131. As illustrated in FIGS. 2A and 2B, four reactant gas flow paths 132 are formed, although any number of ribs 131 and corresponding flow paths 132 can be created. The cathode separator 13a is made, for example, from carbon or a metal. The anode separator 13b is disposed at the outside of the anode electrode 12b. Ribs 131 are provided so as to project from a surface of the anode separator 13b toward the anode electrode 12b, thus forming reactant gas flow paths 132 between the ribs 131. As illustrated in FIGS. 2A and 2B, four reactant gas flow paths 132 are formed, although any number of ribs 131 and corresponding flow paths 132 can be created. The anode separator 13b is made, for example, from carbon or a metal.

In a fuel cell having the above-described structure, catalytic electrode reactions (1) and (2) are carried out in the MEA 10 (the electrolyte membrane 11, the cathode electrode 12a, and the anode electrode 12b), and water ($H_2O$) is produced. The produced water ($H_2O$) generally becomes water vapor that is then discharged to the outside of the fuel cell together with the cathode gas. Alternatively, the produced water ($H_2O$) is discharged to the outside of the fuel cell in the form of liquid water.

However, when the temperature of the ambient environment is low, the saturated water vapor partial pressure decreases. Accordingly, the amount of moisture discharged to the outside of the fuel cell in the form of water vapor significantly decreases. Therefore, the produced water ($H_2O$) may remain inside the fuel cell. The excess accumulation of water ($H_2O$) in the fuel cell is known as flooding. If the produced water ($H_2O$) is accumulated in the reactant gas flow paths 132 of the cathode separator 13a, the flow of the reactant gas (cathode gas) degrades, thereby decreasing the catalytic reaction due to flooding. Furthermore, the produced water ($H_2O$) may permeate through the electrolyte membrane 11 and may be accumulated in the reactant gas flow paths 132 of the anode separator 13b. This also degrades the flow of the reactant gas (anode gas), thereby decreasing the catalytic reaction due to flooding.

In such a flooded state, the output of the fuel cell decreases, and it takes a long time from time of starting of the system until normal operation is achieved (i.e., there is a lengthy startup time period). Normal operation is considered to be a state of fuel cell operation in which a satisfactory electrical output can be obtained. Furthermore, when the temperature of the ambient environment is below the freezing point, the produced water ($H_2O$) remaining inside the fuel cell may freeze, and as a result, the reaction represented by formula (2) is inhibited. Consequently, power generation may not be performed by the fuel cell.

The time at which this flooding phenomenon occurs and inhibits the catalytic reaction is different in respective fuel cells, and depends on factors including, but not limited to, the variation in the performance of each electrode and the variation in the amount of reactant gas supplied. Therefore, at the initial stage in which the flooding phenomenon occurs, the amount of power generation in the fuel cells varies. If a fuel cell is maintained in a flooded condition, the catalytic reaction is decreased in all of the fuel cells of a stack, and thus the electrical output of the fuel cell stack does not attain normal operation levels. More specifically, as shown in FIGS. 1A and 1B, when a reactant gas is supplied at a high pressure, the stack output is high immediately after operation is started (FIG. 1A) while the voltage of the fuel cells varies (that is, the standard deviation of the voltage increases) in the course of the operation (FIG. 1B). But when operation of the fuel cell is continued in the flooded condition, the stack output is not increased.

Accordingly, to avoid a condition whereby the flooding persists and thus inhibits an increase in voltage of the fuel cell stack, the occurrence of flooding is estimated or anticipated in advance based on a parameter value related to the occurrence of flooding. A high pressure gas is supplied until a time immediately before the occurrence of flooding is anticipated to occur, and then the pressure of the supply gas is decreased after that time. Thus, the time period during which the gas is supplied at a high pressure is prolonged as much as possible while avoiding an increase in the startup time due to flooding in one or more of the fuel cells. Thereby, the amount of heat of reaction in the cells is increased to improve the temperature of the cells and to increase performance. As a result, the total time required for startup (i.e., for attaining normal operation) of the fuel cell stack can be reduced.

Figure 3:
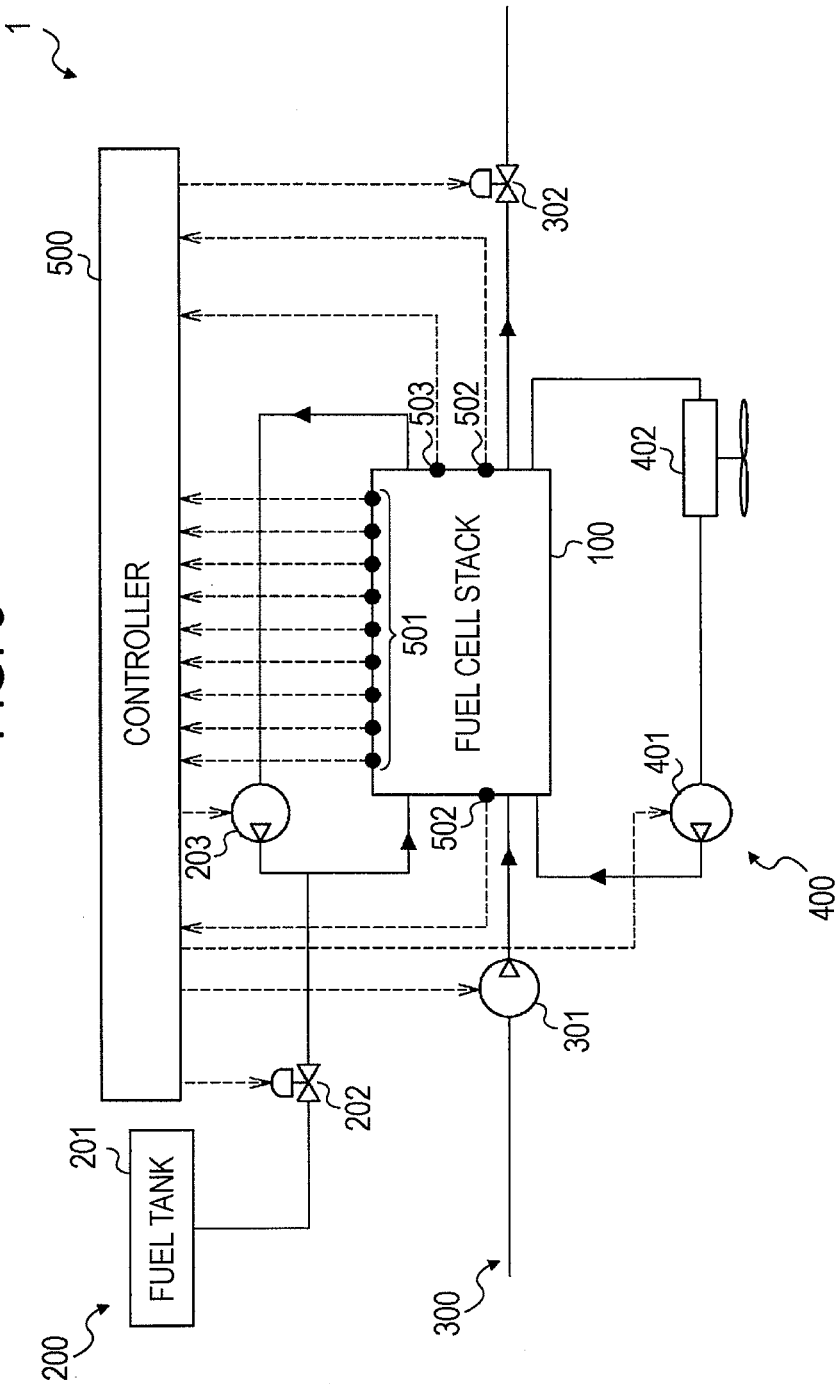
FIG. 3 is a diagram showing a control device of a fuel cell system according to a first embodiment of the present invention.

FIG. 3 is a diagram showing a control device of a fuel cell system according to a first embodiment of the present invention. Each arrow shown by a solid line in the figure indicates a direction of a flow of a gas or the like. Each arrow shown by a broken line in the figure indicates a signal line. A fuel cell system 1 includes a fuel cell stack 100, an anode gas supply system 200, a cathode gas supply system 300, and a refrigerant circulation system 400.

The fuel cell stack 100 includes voltage sensors 501 that detect the voltage of respective fuel cells, voltage sensors 502 that detect the total voltage of the fuel cell stack 100, and a temperature sensor 503 that detects the temperature of the fuel cell stack 100. Signals from the voltage sensors 501, the voltage sensors 502, and the temperature sensor 503 are inputted to a controller 500.

The anode gas supply system 200 includes a fuel tank 201, an anode gas pressure control valve 202, and an anode gas circulating pump 203. The opening of the anode gas pressure control valve 202 is adjusted in accordance with a signal from the controller 500 to control the pressure of an anode gas supplied to the fuel cell stack 100. The cathode gas supply system 300 includes a cathode gas supply pump 301 and a cathode gas pressure control valve 302. The opening of the cathode gas pressure control valve 302 is adjusted in accordance with a signal from the controller 500 to control the pressure of a cathode gas supplied to the fuel cell stack 100. The refrigerant circulation system 400 includes a refrigerant circulating pump 401 and a radiator 402.

Figure 4:
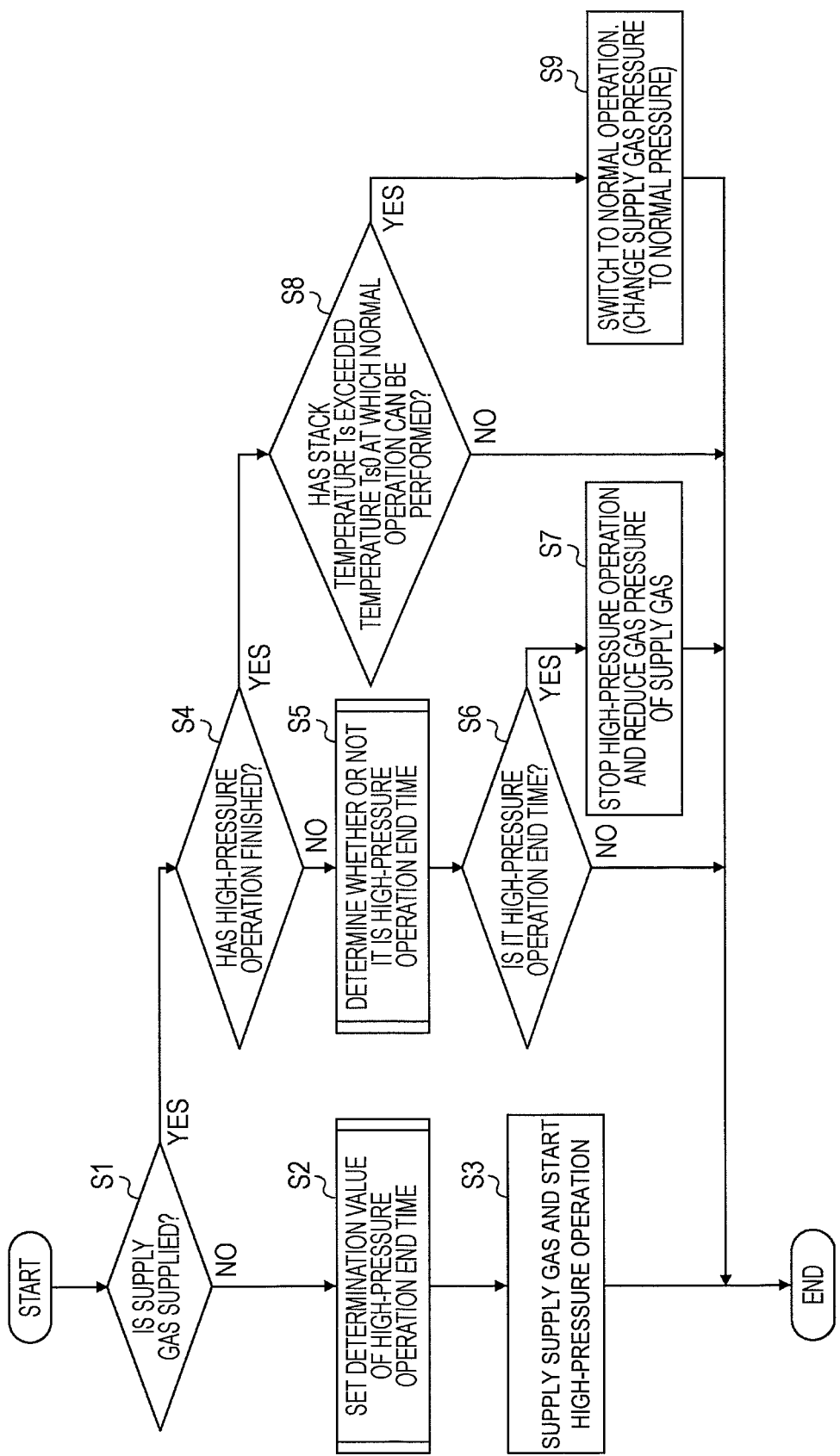
FIG. 4 is a flowchart illustrating a main routine of a startup control device of a fuel cell system according to an embodiment of the present invention.

A specific control logic of the controller 500 will be described below, in conjunction with the flowcharts in the figures. FIG. 4 is a flowchart illustrating a main routine for controlling the operation of a startup control device of a fuel cell system according to the present invention. When the controller 500 detects a start signal, the controller 500 executes the process shown in FIG. 4 repeatedly at predetermined intervals (e.g., every 10 milliseconds).

In Step S1, the controller 500 determines whether a supply gas (an anode gas or a cathode gas) is supplied or not supplied. When the gas is not supplied, the process proceeds to Step S2. When the gas is supplied, the process proceeds to Step S4.

In Step S2, the controller 500 sets a determination value for determining an end time of a high pressure operation state, i.e., an operation state in which the supply gas (the anode gas or the cathode gas) is supplied at a high pressure. A specific setting method will be described below. In Step S3, the controller 500 supplies the supply gas (the anode gas or the cathode gas) at a high pressure, and begins a high pressure operation of the fuel cell stack. When the gas is supplied at a high pressure, the supply pressure of the supply gas (the anode gas or the cathode gas) is set to be a pressure that is preferably higher than would be typically supplied during normal operation. For example, the high pressure can be a maximum pressure that can be realized in the system, regardless of the system temperature at the time of startup or any number of other factors. The maximum pressure that can be realized in a system is commonly at least 150 kPa.

In Step S4, the controller 500 determines whether the high pressure operation state has finished or not. When the high pressure operation state has not yet finished, the process proceeds to Step S5. When the high pressure operation state has already finished, the process proceeds to Step S8.

In Step S5, the controller 500 determines whether or not the end time of the high pressure operation state has been reached. In Step S6, if the controller 500 determines that the end time of the high pressure operation state has not been reached, the process is temporarily exited; if the controller 500 determines that the end time has been reached, the process proceeds to Step S7. In Step S7, the controller 500 stops the high pressure operation state and reduces the supply pressure of the supply gas (the anode gas or the cathode gas). In this pressure reduction, the supply pressure of the supply gas (the anode gas or the cathode gas) is reduced to a pressure that is preferably lower than would typically be supplied during normal operation. For example, the supply pressure can be reduced to a minimum pressure at which the operation can be performed (e.g., approximately atmospheric pressure).

In Step S8, the controller 500 determines whether or not the temperature $T_S$ of the fuel cell stack 100 exceeds a temperature $T_{S0}$ at which normal operation can be performed. When it is determined that the temperature $T_S$ of the fuel cell stack 100 does not exceed the temperature $T_{S0}$, the process is temporarily exited. When it is determined that the temperature $T_S$ of the fuel cell stack 100 exceeds the temperature $T_{S0}$, the process proceeds to Step S9.

In Step S9, the controller 500 switches to normal operation and sets the supply pressure of the supply gas (the anode gas or the cathode gas) to a normal pressure. The supply pressure during the normal operation is set in accordance with a load required for the system. For example, in the case of an unloaded state, a minimum pressure at which fuel cell operation can be performed may be set as the normal supply pressure.

Figure 5B:
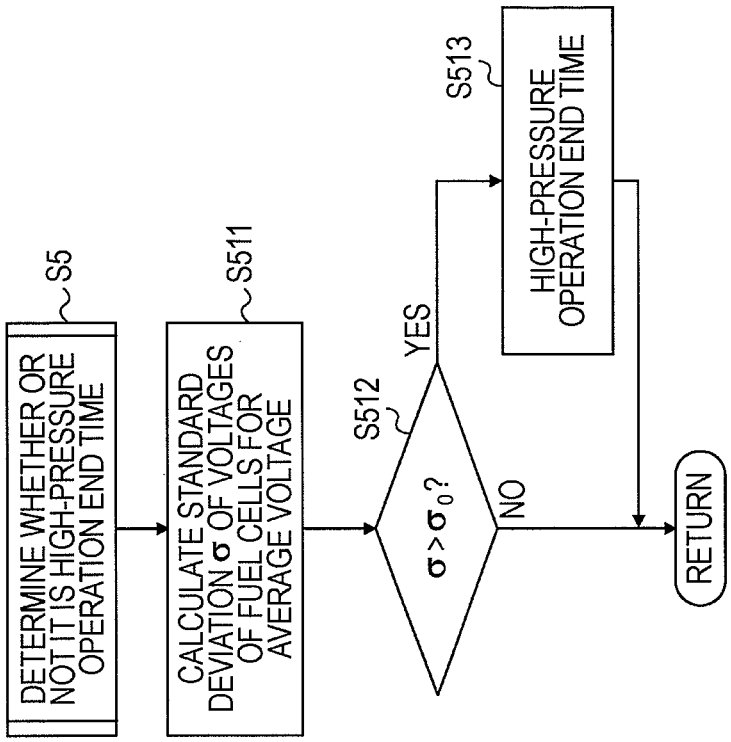
FIGS. 5A and 5B are flowcharts showing subroutines for controlling a startup control device according to a first embodiment of the present invention.
Figure 5A:
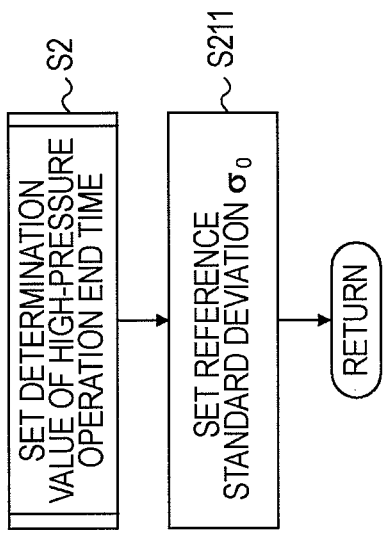

FIGS. 5A and 5B are flowcharts of subroutines of a process for controlling startup of a fuel cell system. In the illustrated embodiment, a parameter value showing the degree of variation in the voltage (e.g., the standard deviation of the fuel cell voltage for the fuel cells in the stack) is calculated on the basis of the cell voltages of the individual stacked fuel cells. The operation state of the supply gas to the fuel cell stack is varied based on this standard deviation. FIG. 5A shows a process of determining and setting a value of the end time of the high pressure operation state during which the supply gas is supplied at a high pressure. In the illustrated embodiment, the process of setting the determination value of the high pressure operation end time is performed as follows. In Step S211, the controller 500 sets a reference standard deviation or determination value $\sigma_0$. The reference standard deviation $\sigma_0$ can be determined on the basis of, for example, the specifications of the fuel cell stack 100 or the temperature of the fuel cell stack 100 at the time of startup the fuel cell system. For example, for a fuel cell in which the single cell voltage output in an unloaded state is 1.0 V, the voltage of the fuel cell in a loaded state is in the range of about 0.4 to 0.8 V. In that case, the reference standard deviation $\sigma_0$ for determining the degree of variation may be set to a value, for example, in the range of about 0.01 V to 0.03 V, which may be varied based on the temperature at the time of startup or any number of other factors.

FIG. 5B shows a process of determining whether the end time of the high pressure operation state has been reached. In the illustrated embodiment, the process of determining the high pressure operation end time is performed as follows. In Step S511, the controller 500 calculates the standard deviation $\sigma$ of the voltages of the fuel cells. In Step S512, the controller 500 determines whether or not the calculated standard deviation $\sigma$ is larger than the reference standard deviation $\sigma$. When it is determined that the calculated standard deviation $\sigma$ is smaller than the reference standard deviation $\sigma_0$, the process is temporarily exited. When it is determined that the calculated standard deviation $\sigma$ is larger than the reference standard deviation $\sigma_0$, the process advances to Step S513, in which the controller 500 determines the high pressure operation end time.

Figure 6A:
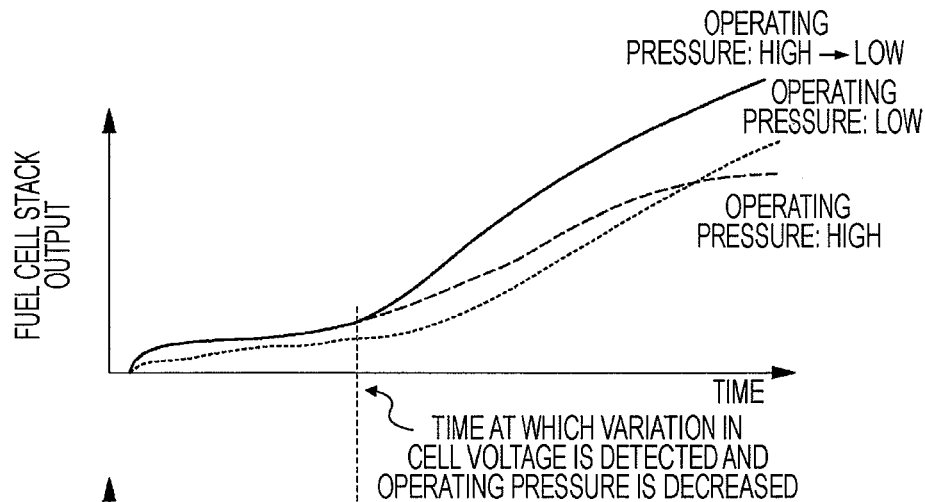
FIGS. 6A to 6C are graphs illustrating the operation of the startup control device of a fuel cell system over time according to an embodiment of the present invention.
Figure 6B:
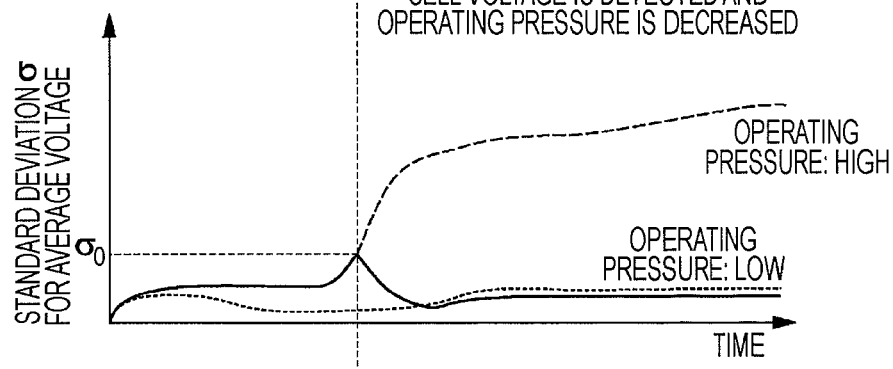
Figure 6C:
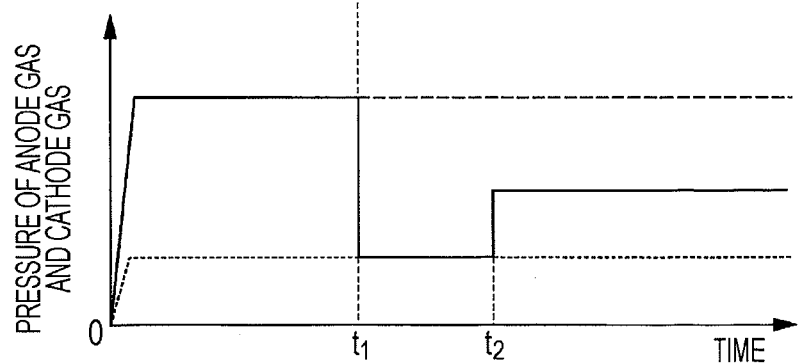

FIGS. 6A to 6C are time graphs illustrating the operation of the startup control device of a fuel cell system according to the present invention. In the description below, step numbers preceded by S of the flowcharts are also given for ease of understanding of the correspondence of the time graphs with the flowcharts.

When the controller 500 detects a start signal, the controller 500 sets a determination value $\sigma_0$ for determining an end time of an operation state in which the supply gas (the anode gas or the cathode gas) is supplied at a high pressure (S2 and S211), supplies the supply gas (the anode gas or the cathode gas) at a high pressure, and starts a high pressure operation (S3). Consequently, the supply pressure of the gas (the anode gas or the cathode gas) increases (FIG. 6C), and the output of the fuel cell stack increases (FIG. 6A).

In the subsequent cycle and thereafter, since the supply gas has already been supplied, the process proceeds to Step S1, then to Step S4, then to Step S5, and the controller 500 determines whether or not the end time of the high pressure operation state has been reached. More specifically, the controller 500 calculates the standard deviation $\sigma$ of the voltages of the fuel cells (Step S511), and a series of Step S1 to Step S4 to Step S5 to Step S511 to Step S512 to Step S6 is repeatedly performed until the standard deviation $\sigma$ becomes larger than the determination value $\sigma_0$.

When the standard deviation $\sigma$ becomes larger than the determination value $\sigma_0$, for example at a time $t_1$ as shown in FIG. 6B, the process proceeds to Step S512 and then to Step S513. The process further proceeds to Step S6 and then to Step S7. Specifically, the controller 500 stops the high pressure operation state and reduces the supply pressure of the supply gas (the anode gas or the cathode gas) (FIG. 6C) to a lower pressure.

In the subsequent cycle and thereafter, since the high pressure operation has been finished, the process proceeds to Step S1, then to Step S4, then to Step S8, and the operation state is maintained until the temperature $T_S$ of the fuel cell stack 100 exceeds the temperature $T_{S0}$ at which normal operation can be performed. Accordingly, flooding can be suppressed, which decreases the standard deviation $\sigma$ (FIG. 6B), and at the same time increases the output of the fuel cell stack (FIG. 6A).

When the temperature $T_S$ of the fuel cell stack 100 exceeds the temperature $T_{S0}$ at which normal operation can be performed, for example at a time $t_2$ as shown in FIG. 6B, the process proceeds to Step S8, then to Step S9. Specifically, the controller 500 switches to normal operation and increases the supply pressure of the supply gas to a normal pressure (FIG. 6C).

According to this embodiment, on detecting a start signal, the supply gas (the anode gas or the cathode gas) is initially supplied at a high pressure. Therefore, the operation of a fuel cell can be started even at low temperatures (including at cryogenic temperatures). However, if the high pressure operation state is maintained, flooding would caused by water produced by the catalytic reaction, and thus it would take a long time to attain normal operation of the fuel cell. However, because the studies conducted in developing an embodiment of the present invention have determined that the standard deviation σ of the voltages of the fuel cells is increased by an excessive amount of produced water, which may lead to flooding, the startup control device described herein can avoid flooding and reach normal operation more quickly. Accordingly, in this embodiment, the supply pressure of the supply gas is decreased from the high pressure operation state on the basis of the standard deviation σ of the fuel cell voltages. Consequently, the flooding phenomenon caused by water produced by the catalytic reaction can be suppressed in advance. As a result, a high output of the fuel cell stack can be maintained, and thus normal operation of the fuel cell stack can be achieved in a short time.

Figure 7:
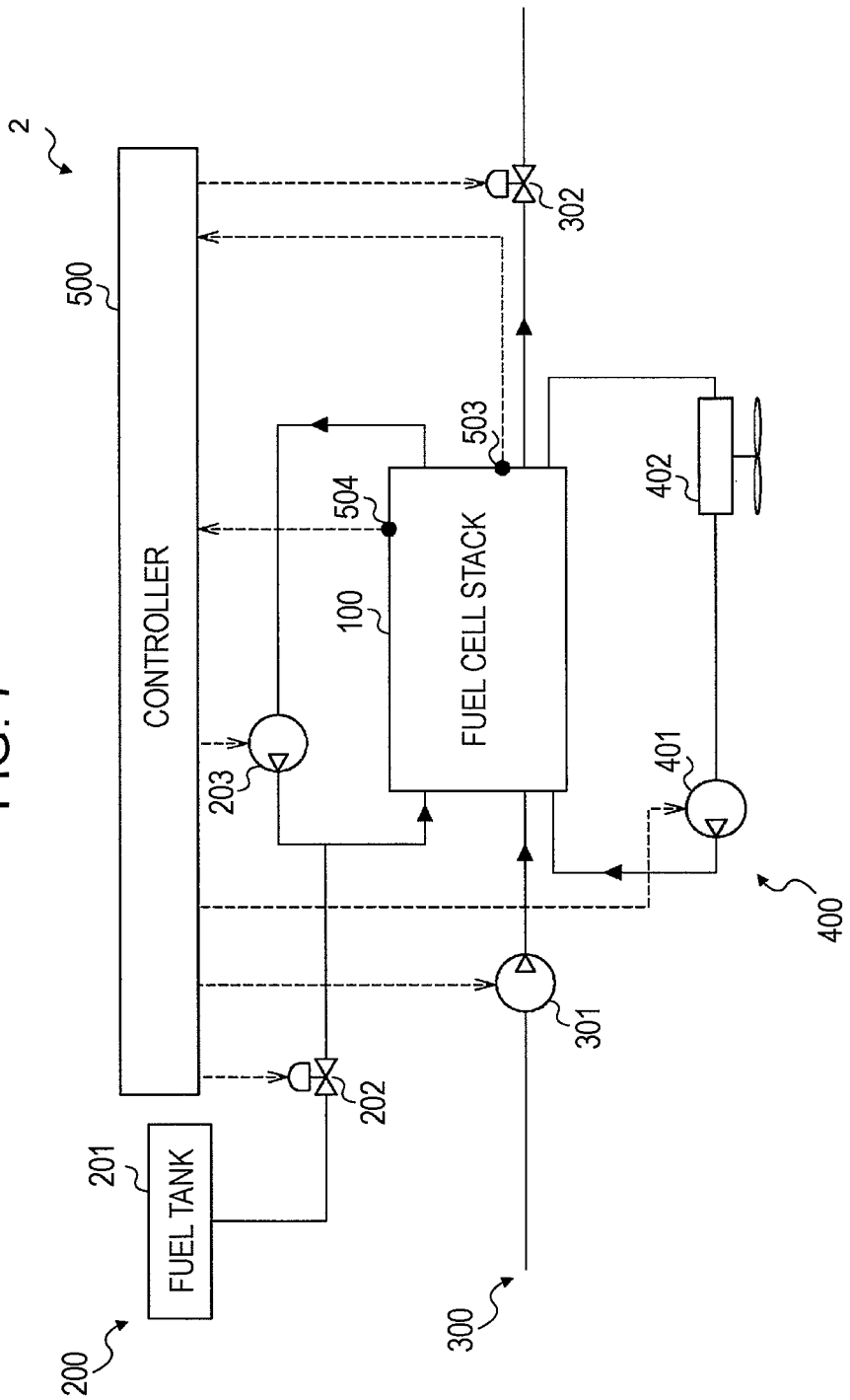
FIG. 7 is a diagram showing a control device of a fuel cell system according to a second embodiment of the present invention.

A second embodiment of the present invention will hereinafter be described with reference to the accompanying drawings. FIG. 7 is a diagram showing a control device of a fuel cell system according to a second embodiment of the present invention.

As discussed above, in the first embodiment, the voltage of each of the fuel cells is detected, and the standard deviation σ of the voltages of the fuel cells is calculated to determine the degree of variation in the power generation of the fuel cells. When the variation is large (i.e., when the standard deviation is large), it is determined that flooding occurs. However, the structure of the first embodiment requires a large number of sensors and a high cost. Consequently, in the second embodiment, a power generation current of the fuel cell stack is detected, and it is anticipated that the amount of water produced by a catalytic reaction is increased on the basis of an increase in the integrated value of the power generation current.

Figure 8B:
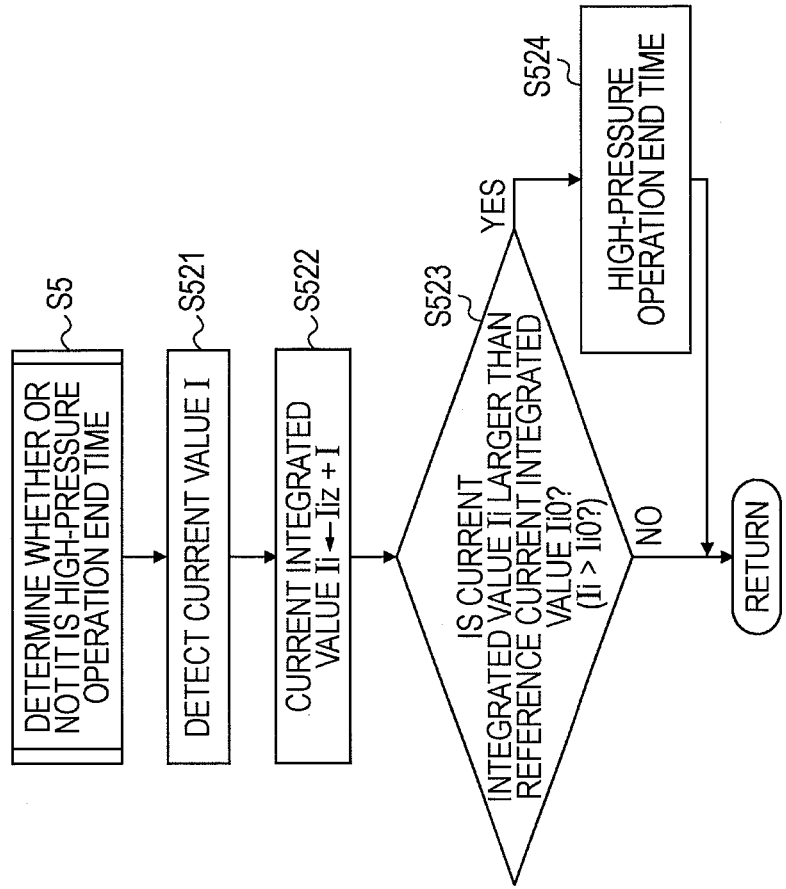
FIGS. 8A and 8B are flowcharts showing subroutines for controlling a startup control device according to a second embodiment of the present invention.
Figure 8A:
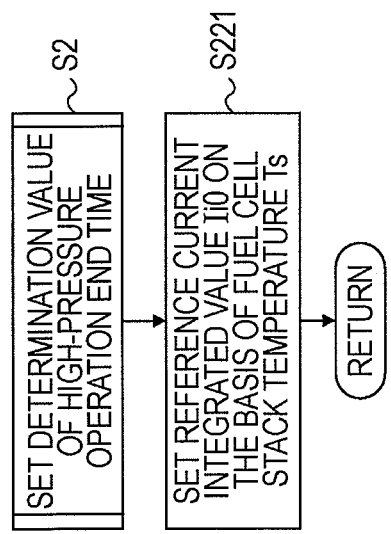

In a fuel cell system 1 of this embodiment, a current sensor 504 detects a power generation current of the fuel cell stack 100. FIGS. 8A and 8B are flowcharts showing subroutines for controlling a startup control device of the second embodiment. FIG. 8A shows a process of setting a determination value of the high pressure operation state end time. FIG. 8B shows a process of determining the high pressure operation state end time. The main process of the second embodiment is the same as that of the first embodiment (as shown in FIG. 4), but a specific determination method is different between the second embodiment and the first embodiment.

Figure 9:
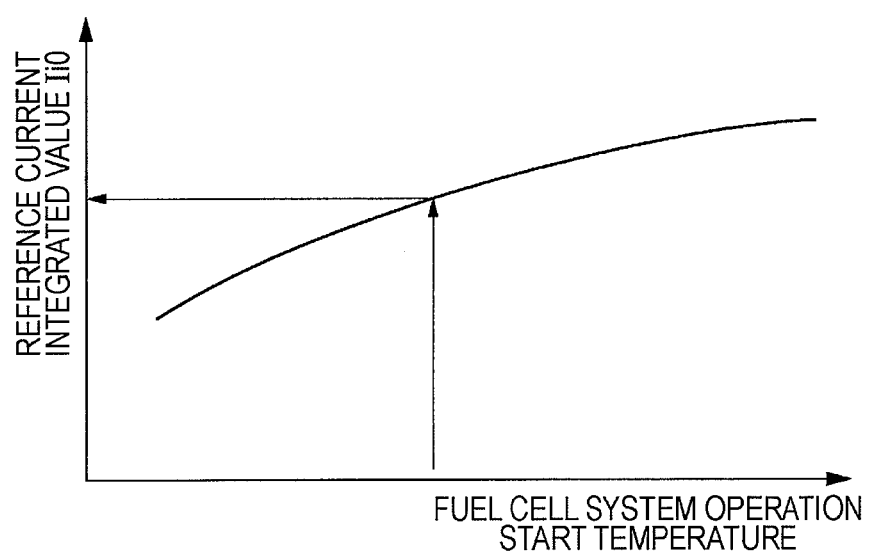
FIG. 9 is a graph showing the relationship between the temperature of a fuel cell stack at the time of startup and a reference current integrated value according to an embodiment of the present invention.

In the second embodiment, the process of setting the determination value of the high pressure operation end time is performed as follows. In Step S221, the controller 500 sets a reference current integrated value $I_{i0}$ on the basis of a temperature $T_S$ of the fuel cell stack 100 at the time of startup. Specifically, the reference current integrated value $I_{i0}$ is set on the basis the relationship with startup temperature depicted in of FIG. 9. As shown in FIG. 9, the reference current integrated value $I_{i0}$ increases as the fuel cell stack temperature $T_S$ at the time of startup increases.

The current integrated value also increases as the amount of power generation in the fuel cell stack increases. That is, the higher the current integrated value, the higher the amount of power generation in the fuel cell stack, and vice-versa. Accordingly, by detecting the current integrated value, the amount of water produced by a reaction in the fuel cell stack can be estimated, and occurrence of flooding in the fuel cell stack can be anticipated.

Therefore, in the second embodiment, the process of determining the high pressure operation end time is performed as follows. In Step S521, the controller 500 detects a current value I. In step S522, the controller 500 determines a current integrated value $I_i$ at this time by adding the current value I to a current integrated value $I_{iZ}$ at the previous time. In Step S523, the controller 500 determines whether or not the current integrated value $I_i$ (at this time) is larger than the reference current integrated value $I_{i0}$. When it is determined that the current integrated value $I_i$ (at this time) is smaller than the reference current integrated value $I_{i0}$, the process is temporarily exited. When it is determined that the current integrated value $I_i$ (at this time) is larger than the reference current integrated value $I_{i0}$, the controller 500 determines the high pressure operation end time (Step S524).

According to the second embodiment, in addition to the advantages of the first embodiment, the number of required sensors can be reduced, and thus the fuel cell system can be produced at a low cost.

Figure 10:
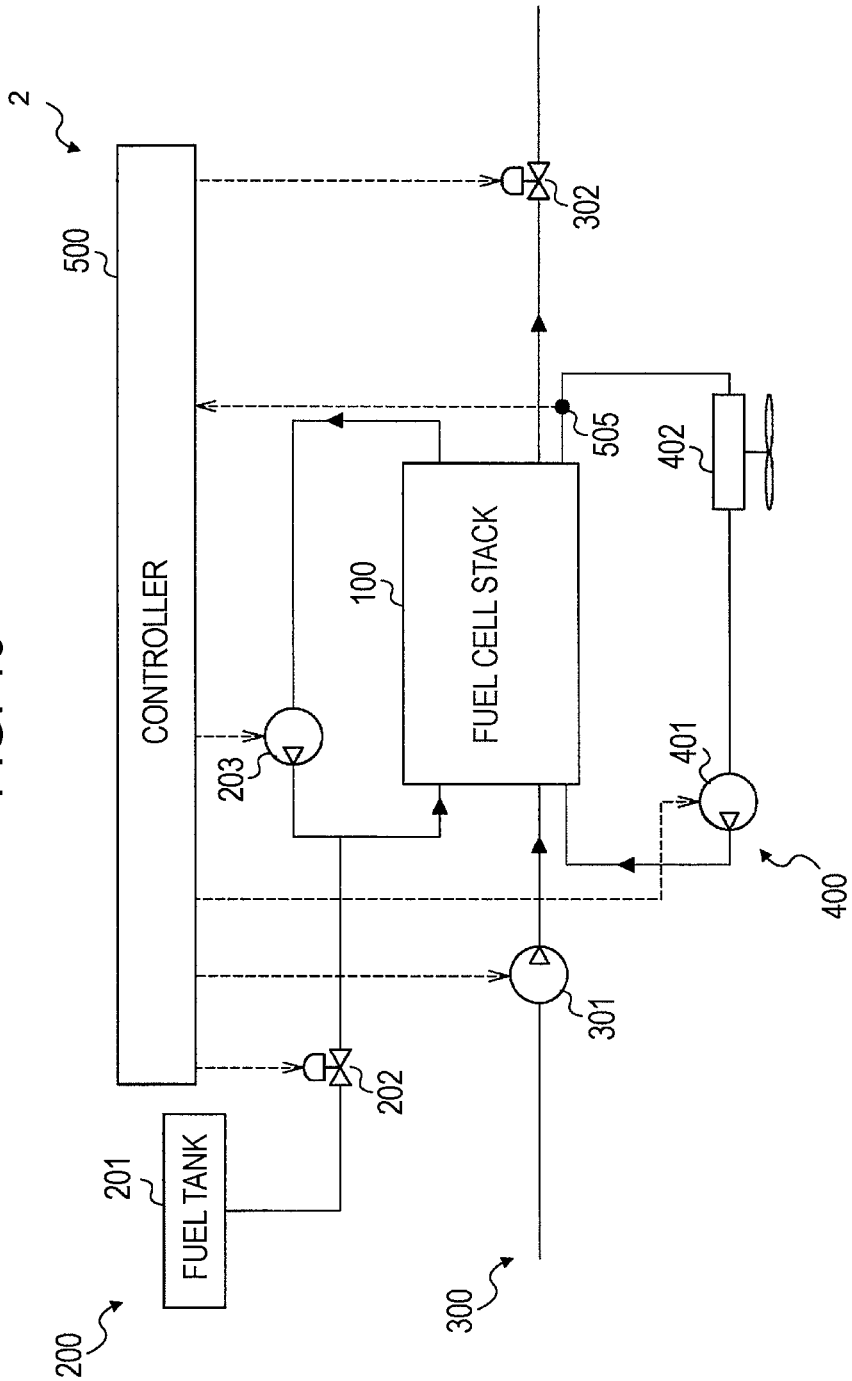
FIG. 10 is a diagram showing a control device of a fuel cell system according to a third embodiment of the present invention.

A third embodiment of the present invention will hereinafter be described with reference to the accompanying drawings. FIG. 10 is a diagram showing a control device of a fuel cell system according to a third embodiment of the present invention. In this embodiment, it is anticipated that the amount of water produced by a catalytic reaction is increased on the basis of an increase in an outlet refrigerant temperature $T_C$ near an outlet of the fuel cell stack in the refrigerant circulation system 400.

The refrigerant temperature increases as the heat of reaction of the fuel cell stack increases. That is, as the refrigerant temperature increases, it is an indication that the amount of power generation in the fuel cell stack has increased. Accordingly, by detecting the refrigerant temperature, the amount of water produced by a reaction in the fuel cell stack can be estimated, and thus occurrence of flooding in the fuel cell stack can be anticipated.

Figure 11A:
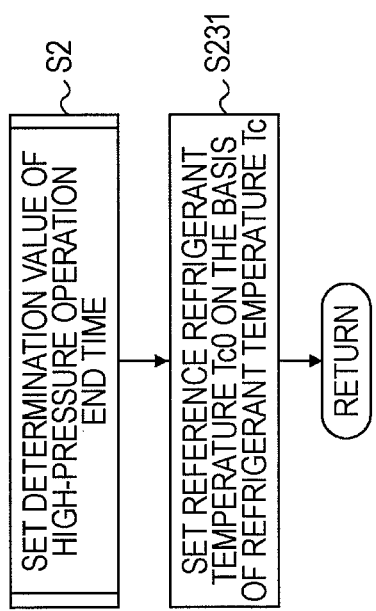
FIGS. 11A and 11B are flowcharts showing subroutines for controlling a startup control device according to a third embodiment of the present invention.
Figure 11B:
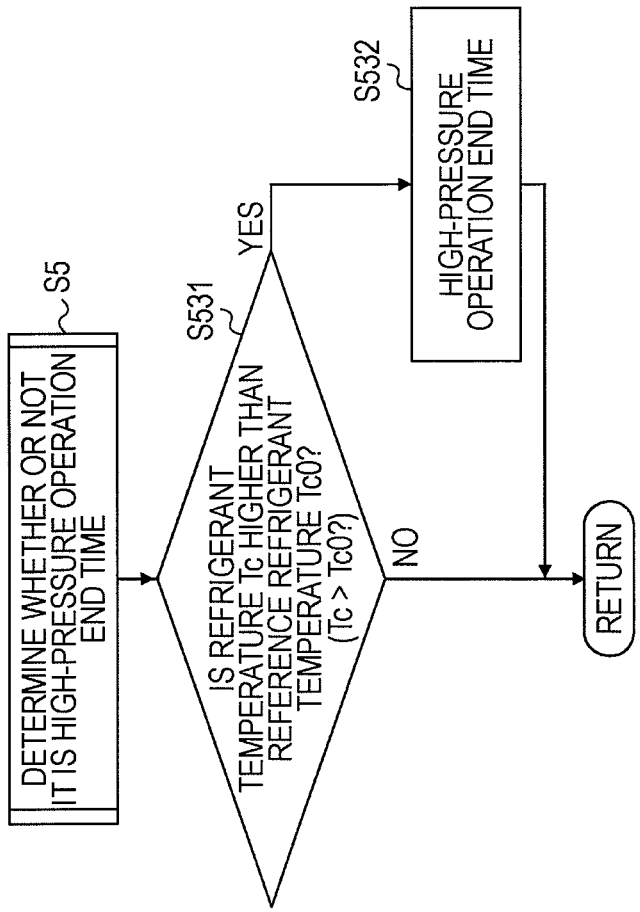

A fuel cell system 1 of this embodiment includes an outlet refrigerant temperature sensor 505 that detects the outlet refrigerant temperature $T_C$ in a refrigerant flow path near the outlet of the fuel cell stack 100. FIGS. 11A and 11B are flowcharts showing subroutines for controlling a startup control device of the third embodiment. FIG. 11A shows a process of setting a determination value of the high pressure operation state end time. FIG. 11B shows a process of determining the high pressure operation state end time. The main process of the third embodiment is the same as that of the first embodiment (as shown in FIG. 4), but a specific determination method is different between the third embodiment and the first embodiment.

Figure 12:
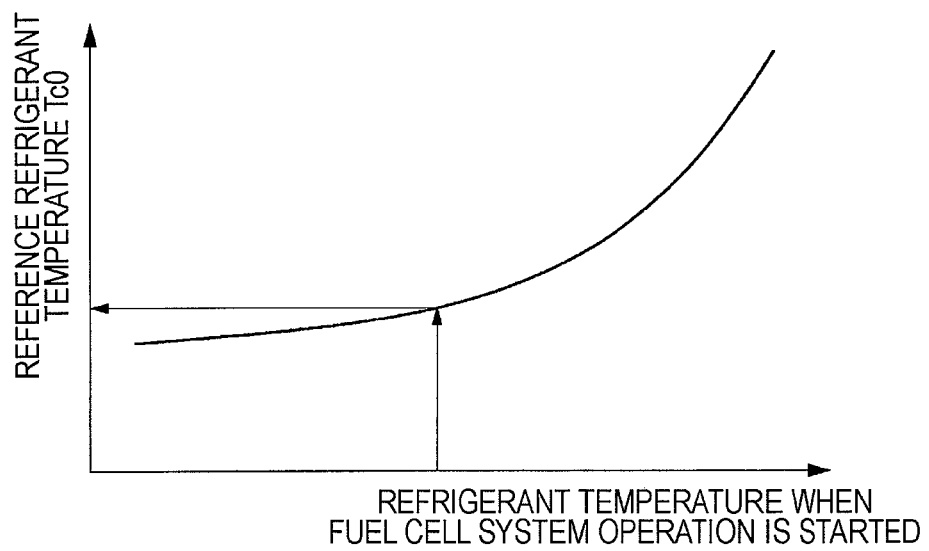
FIG. 12 is a graph showing the relationship between the refrigerant temperature at the time of startup and a reference refrigerant temperature according to an embodiment of the present invention.

In the third embodiment, the process of setting the determination value of the high pressure operation end time is performed as follows. In Step S231, the controller 500 sets a reference refrigerant temperature $T_{C0}$ on the basis of the refrigerant temperature $T_C$. Specifically, the reference refrigerant temperature $T_{C0}$ is set on the basis of the refrigerant response characteristics depicted in FIG. 12. As shown in FIG. 12, as the refrigerant temperature $T_C$ at the time of startup of the fuel cell stack increases, the reference refrigerant temperature $T_{C0}$ increases.

In the third embodiment, the process of determining the high pressure operation end time is performed as follows. In Step S531, the controller 500 determines whether or not the refrigerant temperature $T_C$ is higher than the reference refrigerant temperature $T_{C0}$. When it is determined that the refrigerant temperature $T_C$ is lower than the reference refrigerant temperature $T_{C0}$, the process is temporarily exited. When it is determined that the refrigerant temperature $T_C$ is higher than the reference refrigerant temperature $T_{C0}$, the controller 500 determines the high pressure operation end time (Step S532).

The fuel cell system of the third embodiment is also advantageous in that the number of sensors required can be reduced and thus the fuel cell system can be produced at a low cost.

Figure 13A:
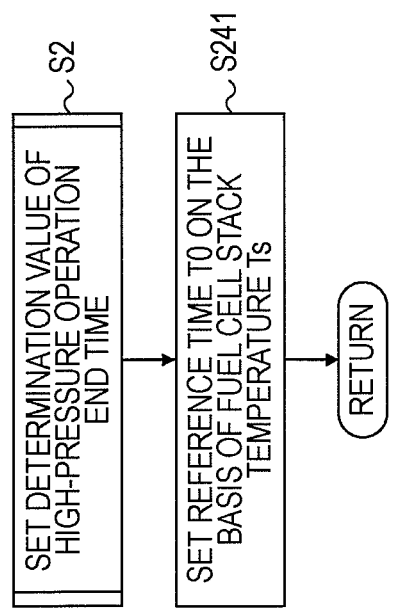
FIGS. 13A and 13B are flowcharts showing subroutines for controlling a startup control device according to a fourth embodiment of the present invention.
Figure 13B:
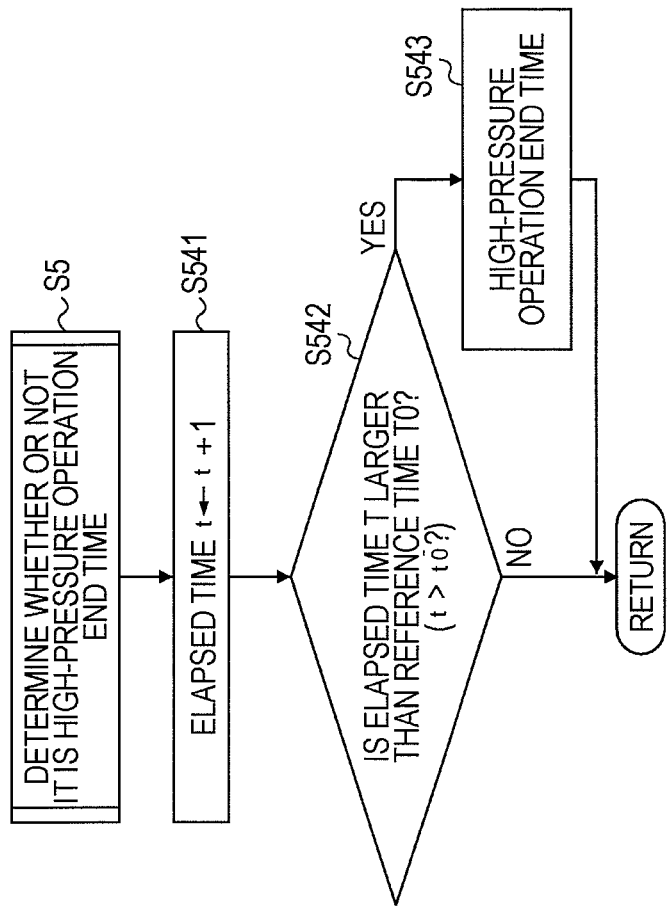

A fourth embodiment of the present invention will hereinafter be described with reference to the accompanying drawings. FIGS. 13A and 13B are flowcharts showing subroutines for controlling a startup control device of a fourth embodiment of the present invention. FIG. 13A shows a process of setting a determination value of the high pressure operation state end time. FIG. 13B shows a process of determining the high pressure operation state end time. The main process of the fourth embodiment is the same as that of the first embodiment (as shown in FIG. 4), but a specific determination method is different between the fourth embodiment and the first embodiment.

Figure 14:
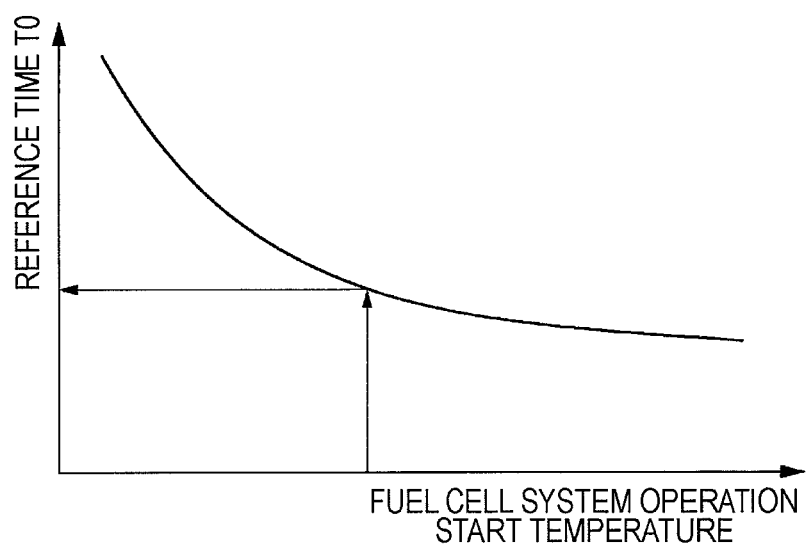
FIG. 14 is a graph showing the relationship between the temperature of a fuel cell stack at the time of startup and a reference time according to an embodiment of the present invention.

In the fourth embodiment, the process of setting the determination value of the high pressure operation end time is performed as follows. In Step S241, the controller 500 sets a reference time to on the basis of a temperature $T_S$ of the fuel cell stack 100 at the time of startup. Specifically, the reference time $t_0$ is set on the basis of the time-temperature characteristics of a fuel cell depicted in FIG. 14. As shown in FIG. 14, the reference time $t_0$ decreases as the temperature $T_S$ of the fuel cell stack 100 at the time of startup increases.

In one example, in the case where the startup temperature of the fuel cell stack is in the range of about −20° C. to −30° C., a time in the range of about 30 seconds to about 40 seconds can be set as the reference time to. In another example, in the case where the startup temperature of the fuel cell stack is in the range of about 20° C. to 30° C., a time in the range of about 10 seconds to about 20 seconds can be set as the reference time $t_0$.

In the fourth embodiment, the process of determining the high pressure operation end time is performed as follows. In Step S541, the controller 500 integrates an elapsed time t. As described above, this routine is executed at predetermined intervals, and thus the elapsed time can be determined by this integrated value. In Step S542, the controller 500 determines whether or not the elapsed time t is larger than the reference time $t_0$. When it is determined that the elapsed time t is smaller than the reference time $t_0$, the process is temporarily exited. When it is determined that the elapsed time t is larger than the reference time $t_0$, the controller 500 determines the high pressure operation end time (Step S543).

According to the fourth embodiment, the number of sensors required can be reduced, and thus the fuel cell system can be produced at a low cost, as compared with the second embodiment and the third embodiment.

Figure 15:
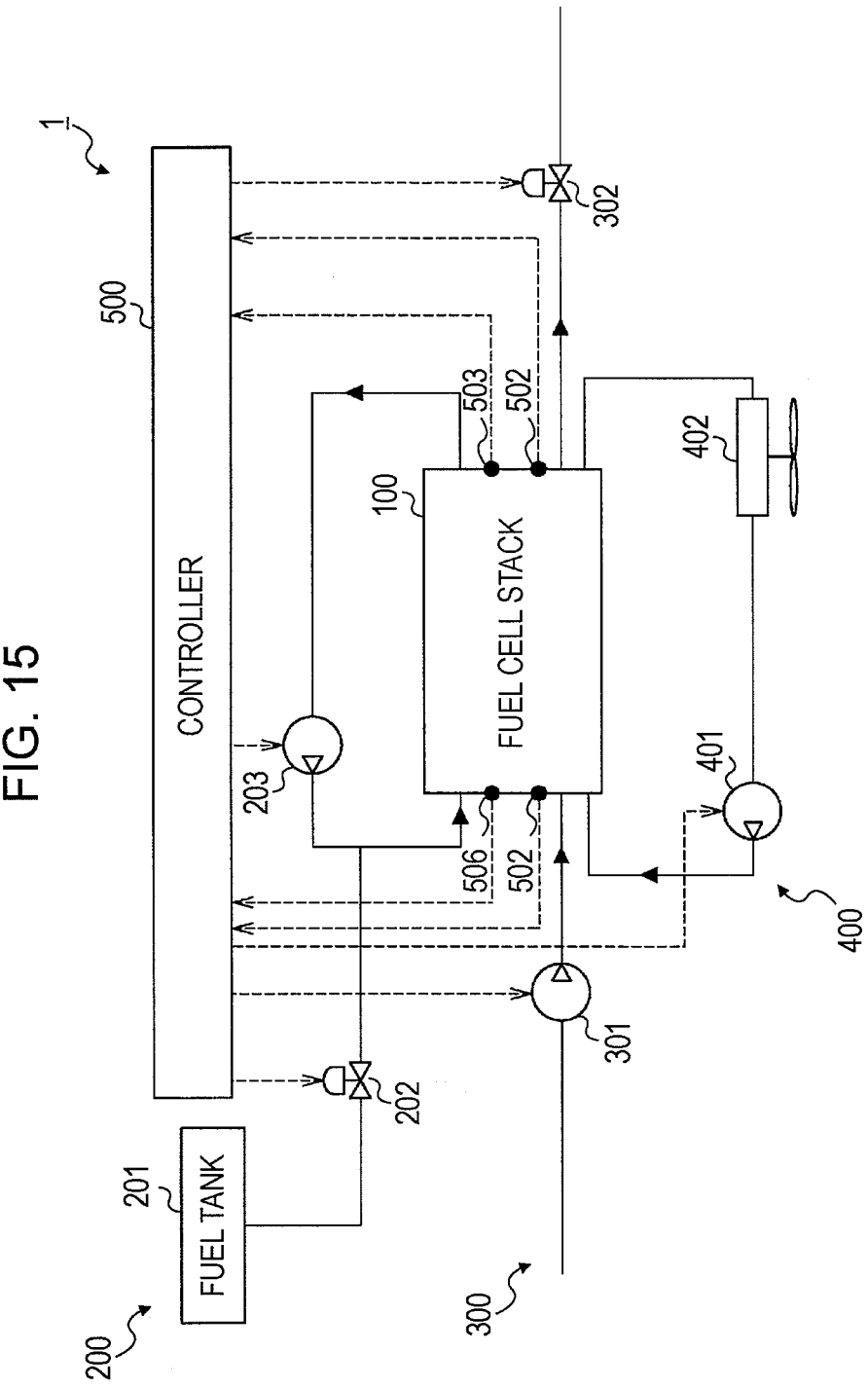
FIG. 15 is a diagram showing a control device of a fuel cell system according to a fifth embodiment of the present invention.

A fifth embodiment of the present invention will hereinafter be described with reference to the accompanying drawings. FIG. 15 is a diagram showing a control device of a fuel cell system according to a fifth embodiment of the present invention.

In the first embodiment, the voltage of each of the fuel cells is detected, and the standard deviation σ of the voltages of the fuel cells is calculated to determine the degree of variation in the power generation of the fuel cells. When the variation is large (i.e., when the standard deviation is large), it is determined that flooding occurs. However, flooding occurs more easily at an end cell. Consequently, in the fifth embodiment, a voltage $V_{end}$ of an end cell is particularly detected, and it is anticipated that the amount of water produced by a catalytic reaction is increased when the end cell voltage $V_{end}$ significantly deviates from an average cell voltage $V_{ave}$ of the entire fuel cell stack.

A fuel cell system 1 of the fifth embodiment includes voltage sensors 502 that detect the total voltage of a fuel cell stack, a temperature sensor 503 that detects the temperature of the fuel cell stack, and a voltage sensor 506 that detects the voltage of an end cell.

Figure 16B:
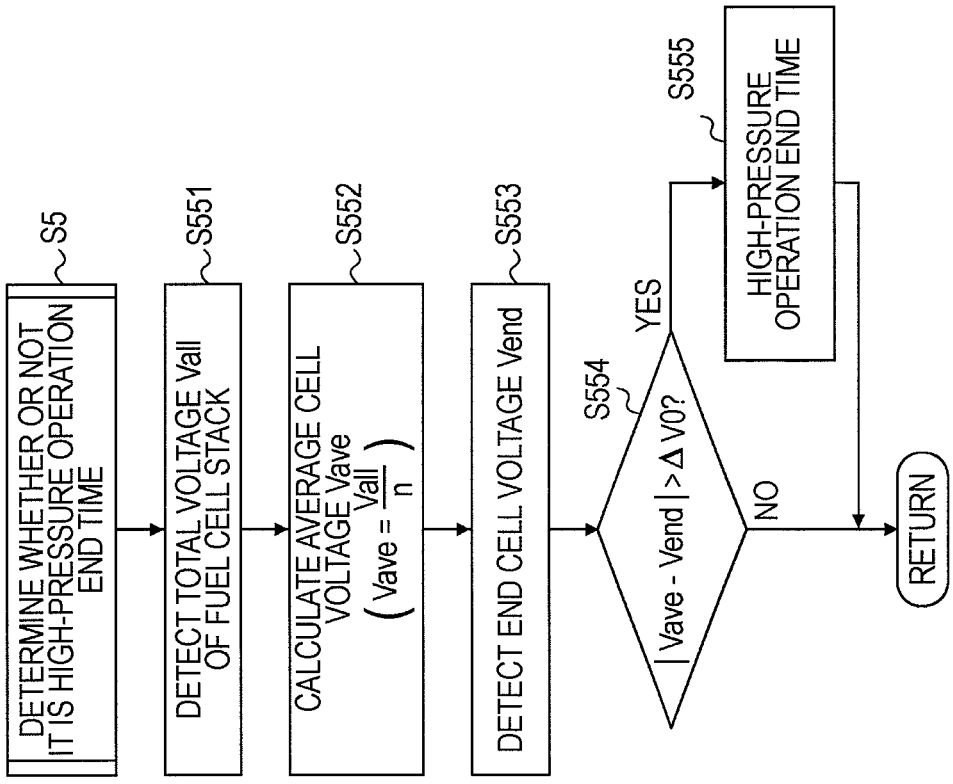
FIGS. 16A and 16B are flowcharts showing subroutines for controlling a startup control device according to a fifth embodiment of the present invention.
Figure 16A:
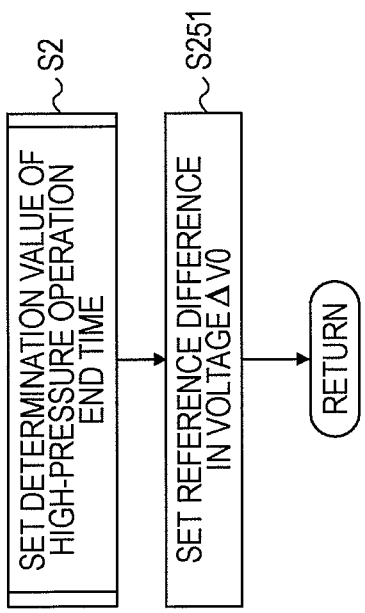

FIGS. 16A and 16B are flowcharts showing subroutines for controlling a startup control device of the fifth embodiment. FIG. 16A shows a process of setting a determination value of the high pressure operation state end time. FIG. 16B shows a process of determining the high pressure operation state end time. The main process of the fifth embodiment is the same as that of the first embodiment (as shown in FIG. 4), but a specific determination method is different between the fifth embodiment and the first embodiment.

In the fifth embodiment, the process of setting the determination value of the high pressure operation end time is performed as follows. In Step S251, the controller 500 sets a reference difference in voltage $\Delta V_0$. This reference difference in voltage $\Delta V_0$ can be determined, for example, on the basis of the temperature of the fuel cell stack 100 at the time of startup.

In the fifth embodiment, the process of determining the high pressure operation end time is performed as follows. In Step S551, the controller 500 detects a total voltage $V_{all}$ of the fuel cell stack. In Step S552, the controller 500 calculates the average voltage $V_{ave}$ by dividing the total voltage $V_{all}$ of the fuel cell stack by the number of cells n.

In Step S553, the controller 500 detects the voltage $V_{end}$ of an end cell of the fuel cell stack. In Step S554, the controller 500 determines whether or not the absolute value of the difference in voltage between the average voltage $V_{ave}$ and the end cell voltage $V_{end}$ is larger than the reference difference in voltage $\Delta V_0$. When it is determined that the absolute value is smaller than the reference difference in voltage $\Delta V_0$, the process is temporarily exited. When it is determined that the absolute value is larger than the reference difference in voltage $\Delta V_0$, the controller 500 determines the high pressure operation end time (Step S555).

The fuel cell system of the fifth embodiment is advantageous in that the number of sensors required can be reduced and thus the fuel cell system can be produced at a low cost. In addition, flooding occurs particularly easily in an end cell. Therefore, according to the structure of this embodiment, an increase in the amount of water produced by a catalytic reaction can be anticipated with high accuracy, a flooding phenomenon caused by water produced by the catalytic reaction can be suppressed in advance, and normal operation of the fuel cell stack can be achieved in a short time.

A sixth embodiment of the present invention will hereinafter be described with reference to the accompanying drawings. FIG. 17 is a flowchart showing a main routine for controlling a startup control device of a sixth embodiment of the present invention.

Figure 18:
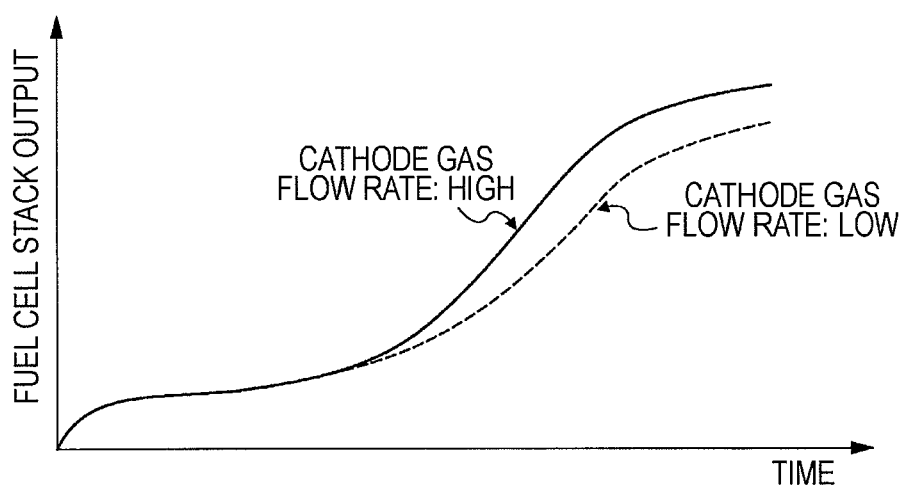
FIG. 18 is a graph illustrating the fuel cell stack voltage output during startup versus time according to a sixth embodiment of the present invention.

The sixth embodiment is basically the same as the first embodiment. However, in Step S72, the controller 500 stops the high pressure operation and decreases the supply pressure of the supply gas (the anode gas or the cathode gas), and increases the flow rate of the cathode gas. When the flow rate of the cathode gas is increased in this manner, the output of the fuel cell stack can be increased, as shown in FIG. 18. Accordingly, the operation of the fuel cell stack can be started rapidly and in a short time, as compared with the above-described other embodiments.

The embodiments described above can be used to control either the cathode side or the anode side of a fuel cell. However, the invention described above is preferably used at the cathode side, which is generally more affected by produced water.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A startup control device of a fuel cell system comprising:
a fuel cell stack having a plurality of fuel cells stacked together, each of the fuel cells having a membrane electrode assembly including an electrolyte membrane interposed between a cathode electrode and an anode electrode;
a gas supply unit configured to supply a reactant gas to the fuel cell stack; and
a controller configured to control the gas supply unit based on a parameter value related to the occurrence of flooding of the fuel cell stack;
wherein during startup of the fuel cell stack, the controller is configured to control the gas supply unit to supply the reactant gas to the fuel cell stack at a first supply pressure for a time period determined based on the parameter value; and
wherein after the time period has expired, the controller is configured to control the gas supply unit to supply the reactant gas to the fuel cell stack at a second supply pressure, the second supply pressure being less than the first supply pressure.

2. The startup control device according to claim 1, further comprising:
an integrated current value calculator configured to calculate an integrated value of a power generation current of the fuel cell stack;
wherein the parameter value is the integrated value of the power generation current of the fuel cell stack; and
wherein the time period expires when the integrated value of the power generation current of the fuel cell stack exceeds a predetermined reference integrated value.

3. The startup control device according to claim 2, further comprising:
a startup temperature detector configured to detect the temperature of the fuel cell stack at the time of startup;
wherein the higher the temperature of the fuel cell stack at the time of startup, the larger the reference integrated value.

4. The startup control device according to claim 1, further comprising:
a refrigerant flow path through which a refrigerant that has cooled the fuel cell stack flows; and
an outlet refrigerant temperature detector provided to detect the refrigerant temperature in the refrigerant flow path near a stack outlet;
wherein the parameter value is the refrigerant temperature detected by the outlet refrigerant temperature detector; and
wherein the time period expires when the refrigerant temperature exceeds a reference temperature.

5. The startup control device according to claim 4, further comprising:
a fuel cell stack temperature detector configured to detect the temperature of the fuel cell stack;
wherein the higher the temperature of the fuel cell stack at the time of startup, the higher the reference temperature.

6. The startup control device according to claim 1,
wherein the parameter value is an elapsed time after the operation of the fuel cell stack is started; and
wherein the time period expires when the elapsed time exceeds a reference time which becomes smaller with an increase in the temperature of the fuel cell stack at the time of startup.

7. A startup control device of a fuel cell system comprising:
a fuel cell stack having a plurality of fuel cells stacked together, each of the fuel cells having a membrane electrode assembly including an electrolyte membrane interposed between a cathode electrode and an anode electrode;
a gas supply unit configured to supply a gas to the fuel cell stack; and
a controller configured to control the gas supply unit based on a parameter value related to the occurrence of flooding of the fuel cell stack;
wherein during startup of the fuel cell stack, the controller is configured to control the gas supply unit to supply the gas to the fuel cell stack at a first supply pressure for a time period determined based on the parameter value;
wherein after the time period has expired, the controller is configured to control the gas supply unit to supply the gas to the fuel cell stack at a second supply pressure, the second supply pressure being less than the first supply pressure;
wherein the parameter value is a variation in the voltage of the fuel cells;
wherein the controller is configured to compare the variation in the voltage with a predetermined value; and
wherein the time period expires when the variation in the voltage of the fuel cells is larger than the predetermined value.

8. The startup control device according to claim 7, further comprising:
a plurality of fuel cell voltage detectors configured to detect the voltage of each of the fuel cells;
wherein the variation in the voltage is the standard deviation of the voltages of the fuel cells determined by the fuel cell detectors.

9. The startup control device according to claim 7,
wherein the first supply pressure is a maximum pressure at which the gas can be supplied.

10. The startup control device according to claim 7,
wherein the second supply pressure is a minimum pressure at which operation of the fuel cell stack is maintained.

11. The startup control device according to claim 7,
wherein when the gas is supplied to the fuel cell stack at the second supply pressure, the amount of cathode gas supplied is increased.

12. The startup control device according to claim 7, further comprising:
a fuel cell stack voltage detector configured to detect the voltage of the fuel cell stack; and
an end cell voltage detector configured to detect at least the voltage of an end cell located at an end of the fuel cell stack;
wherein when the difference between the end cell voltage and an average voltage of the fuel cell stack exceeds a predetermined difference in the voltage, it is determined that the variation in the voltage of the fuel cells is larger than the predetermined value.

13. A fuel cell system comprising:

a fuel cell stack in which a plurality of fuel cells are stacked together, each of the fuel cells having a membrane electrode assembly including an electrolyte membrane interposed between a cathode electrode and an anode electrode;

a gas supply unit configured to supply a reactant gas to the fuel cell stack; and a controller configured to compare a parameter value showing the degree of variation in the voltage of the fuel cells with a predetermined value and configured to control the gas supply unit based on the parameter value;

wherein during startup of the fuel cell stack, when the degree of variation in the voltage is larger than the predetermined value, the controller is configured to control the supply pressure of the reactant gas supplied to the fuel cells so that the supply pressure is lower than the supply pressure of the reactant gas when the degree of variation in the voltage is smaller than the predetermined value.

* * * * *